United States Patent [19]

Arman

[11] 3,864,783

[45] Feb. 11, 1975

[54] METAL ARTICULATED SUPPORTS FOR WIPER BLADES OF WINDSHIELD WIPERS ON MOTOR VEHICLES

[76] Inventor: Dario Arman, 15 Piazza Adriano, Turin, Italy

[22] Filed: May 10, 1973

[21] Appl. No.: 359,148

[30] Foreign Application Priority Data
May 13, 1972 Italy .................................. 68510/72

[52] U.S. Cl. ........................... 15/250.42, 15/250.32
[51] Int. Cl. ........................... B60s 1/04, B60s 1/40
[58] Field of Search ....... 15/250.32, 250.36, 250.37, 15/250.38, 250.39, 250.40, 250.41, 250.42

[56] References Cited
UNITED STATES PATENTS
3,585,672   6/1971   Habert ........................... 15/250.32

FOREIGN PATENTS OR APPLICATIONS
1,183,446   3/1970   Great Britain .................. 15/250.32
1,238,385   7/1971   Great Britain .................. 15/250.42

Primary Examiner—Peter Feldman
Attorney, Agent, or Firm—Breitenfeld & levine

[57] ABSTRACT

An improved support for the wiper blades of automotive windshield wipers includes an articulation having a spacer element fitted astride the edges of the open bottom seat of an inner part, the inner part being fixed to a fork shaped outer part.

2 Claims, 5 Drawing Figures

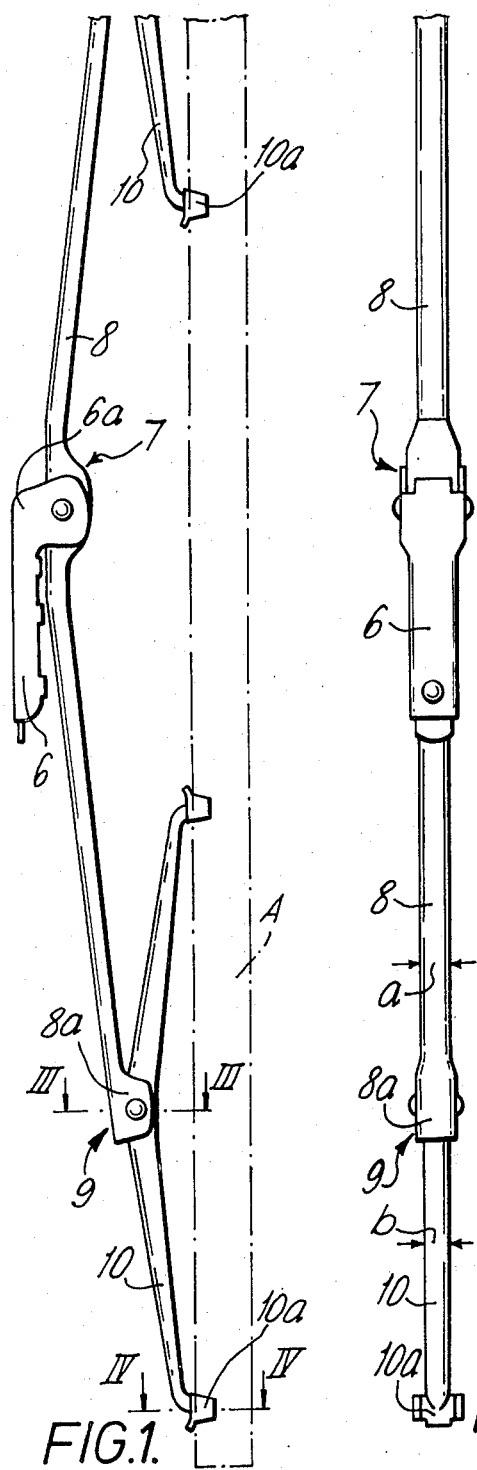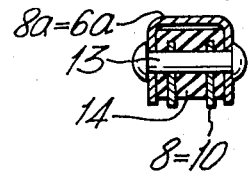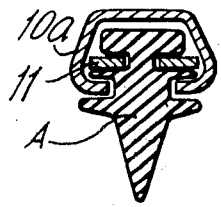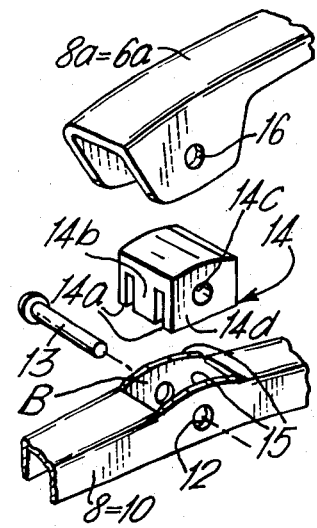

METAL ARTICULATED SUPPORTS FOR WIPER BLADES OF WINDSHIELD WIPERS ON MOTOR VEHICLES

Metal supports for wiper blades in windshield wiper installations on motor vehicles comprise, as known, a central principal bar pivotally connected to a box-shaped member for the connection of the wiper at the end of the corresponding oscillating arm, and at least a pair of rocker arms centrally pivoted with respect to the ends of the principal bar; the articulations between the members forming each support are provided by pivots which mutually engage the metal parts directly contacting each other.

This traditional and known arrangement causes operating drawbacks deriving from the fact that, if between the contacting metal surfaces of the articulated members oxide forms and/or dust and grease deposition occurs, the support loses in flexibility and consequently its adaptability to the curved surface of the glass to be wiped, having a variable curvature, because its articulations become rigid.

In order to eliminate said drawbacks, the improvement according to the invention is characterized in that, in the articulations of the support, intermediate or spacing elements are used which are so shaped as to be mounted astride the principal bar and the rocker arms, in correspondence to the pivot; said spacing elements having a substantially comb-shaped transversal outline, present their sides inserted between the opposed surfaces of the metal support articulations and serve as antifriction bearings.

Another particular feature of the support according to the improvement derives from the ribbed shape with a U cross section given to the elements which form it, in that both the principal bar and the rocker arms are very narrow and present, at their ends, widening of the U branches only in correspondence of the articulations.

Other features of the improvement will become apparent from the following specification and the drawing annexed as a demonstrative and non-limiting example, wherein:

FIGS. 1 and 2 are respectively a side view and a top view of the support according to the invention;

FIG. 3, in a greater scale, is a transversal section view along line III-III of FIG. 1;

FIG. 4 is a transversal section view of same along line IV—IV of same FIG. 1; and FIG. 5 is a perspective exploded view of the elements forming an articulation.

With reference to the drawing, 6 indicates the element for the connection of the wiper blade to the end of the corresponding rocker arm element. Element 6 is articulated at 7 on the principal bar 8 and the ends 8a of bar 8 are articulated at 9 on the central part of the rocker arms 10. Ends 10a of rocker arms 10 engage the flexible metal laminae 11 which are inserted in the sides of the upper part of the wiper blade A.

As previously stated, concerning either the articulation of end 6a of element 6 with respect to the bar 8, or the articulations of ends 8a of same with respect to the rocker arms 9, at the location of the coaxial seats 12 of the transversal pivots 13, the U cross section of bar 8 and rocker arms 10 is open, as indicated with B in FIG 5 in order to provide a fixed coupling seat for the spacing or intermediate element 14, having a comb-shaped front outline.

The dimensions of the spacer 14 are such that its cuts 14a accommodate, in fixed coupling, the side edges 15 of seat B wherein the central part 14b of element 14 penetrates and is fixed. Each spacer element 14 has substantially the shape of a regular hexahedron as shown in FIG. 5.

End 6a of element 5 and/or ends 8a of bar 8, shaped as shown on FIG. 5, are mounted astride the corresponding intermediate element 14, which is provided with a transversal seat 14c suitable to receive pivot 13 but with a diameter slightly smaller than that of seats 12 and 16 of the parts to be articulated.

In these conditions, the inner surfaces of the fork-shaped part 6a–8a do not contact the metal side surfaces of part 8–10 but contact with the outer opposed faces 14d of element 14 while pivot 13 providing the articulated coupling with the skirt of its shank, touches only the interior of transversal seat 14c which is made of an anti- friction material.

As previously mentioned, a second particular feature of the support according to the invention derives from the fact that the thickness or width dimension $a$, $b$ FIG. 2, bar 8 and rocker arms 10, respectively, are very reduced with respect to the corresponding ends 8 $a$, 10$a$ in order to confer a remarkable transversal rigidity to the support together with an outline having a good aerodynamic penetration.

The advantages deriving from the use of the support according to the invention are evident, as concerning the excellent elastic deformability of same in the vertical direction with respect to the surface of the glass to be wiped and as the perfect efficiency and the longer life of its different articulations.

It is to be understood that the description herin of a preferred embodiment according to the invention is set forth as an example thereof and is not to be construed or interpreted as a limitation on the claims which follow and define the invention.

What is claimed is:

1. A windshield wiper assembly comprising:
   a. a principal bar articulated at its midpoint to a connector element for connection to the end of an oscillating arm of a motor vehicle,
   b. a pair of rocker arms each articulated at its midpoint to an end of said principal bar,
   c. each of said bar and rocker arms having a U-shaped cross-section defining parallel side walls and a connector wall between them, each said connector wall having an opening at its midpoint between the ends of its respective bar or rocker arm,
   d. said connector element and each end of said bar having a U-shaped cross-section defining parallel side walls, the side walls of said connector element being spaced apart a distance greater than the width of the midpoint of said bar and the side walls at each end of said bar being spaced apart a distance greater than the width of the midpoint of its respective rocker arm,
   e. aligned holes in the side walls of said connector element and the side walls at the midpoint of said bar and a pivot pin extending through all said holes, and aligned holes in the side walls of each end of said bar and in the side walls of each rocker arm at its midpoint and a pivot pin extending through aligned holes at each end of said bar, and
   f. three molded plastic spacer elements each having substantially the shape of a regular hexahedron, each spacer element having two parallel slots extending into the body of the element from one face of the spacer element and a through hole perpendicular to said slots, g. one of said spacer elements being arranged between the side walls of said connector element with its slots accommodating the side walls at the midpoint of said bar, the portion of said spacer element between the slots fitting through the opening in the connector wall of said bar, and the through hole in said spacer element being aligned with the holes in the side walls of said connector element and at the midpoint of said bar, said pivot pin passing through said through hole, and h. each of the other two of said spacer element being arranged between the side walls at each end of said bar with its slots accommodating the side walls at the midpoint of each rocker arm, the portion of said spacer element between the slots fitting through the opening in the connector wall of its respective rocker arm, and the through hole in said spacer element being aligned with the holes in the side walls of the respective end of said bar and at the midpoint of its respective rocker arm, the respective pivot pin passing through said hole.

2. A windshield wiper assembly as defined in claim 1 wherein the through hole in each of said spacer elements has a diameter smaller than the diameter of the other holes with which it is in alignment.

* * * * *